United States Patent
Herman et al.

[11] Patent Number: 5,619,939
[45] Date of Patent: Apr. 15, 1997

[54] DISC OPENER

[76] Inventors: Alvin Herman, 3105 Taylor Street E., Saskatoon, Saskatchewan, Canada, S7H 1X5; Rubien Herman, Box 567, Outlook, Saskatchewan, Canada, S0L 2N0

[21] Appl. No.: 431,116

[22] Filed: Apr. 28, 1995

[51] Int. Cl.⁶ ........................................ A01C 5/00
[52] U.S. Cl. .............. 111/163; 111/924; 111/157; 111/195; 172/166
[58] Field of Search .................................. 111/157, 163, 111/167, 190, 191, 192, 193, 194, 195, 196, 924, 174, 176; 172/166

[56] References Cited

U.S. PATENT DOCUMENTS

| | | |
|---|---|---|
| 1,698,019 | 1/1929 | Howell et al. . |
| 1,761,858 | 6/1930 | Werk . |
| 2,269,724 | 1/1942 | Linkogel . |
| 2,345,929 | 4/1944 | Freeman . |
| 2,420,551 | 5/1947 | Morkoski . |
| 2,765,756 | 10/1956 | Webster ........................ 111/167 X |
| 2,771,044 | 11/1956 | Putifer ........................ 111/193 X |
| 3,768,569 | 10/1973 | Nunnery . |
| 3,964,639 | 6/1976 | Norris et al. ........................ 221/278 |
| 4,031,834 | 6/1977 | Klenke ........................ 111/195 |
| 4,141,302 | 2/1979 | Morrison, Jr. et al. ............. 111/195 X |
| 4,398,478 | 8/1983 | Frase et al. ........................ 111/196 |
| 4,407,207 | 10/1983 | Dreyer ........................ 111/167 X |
| 4,408,551 | 10/1983 | Keller et al. ........................ 111/163 |
| 4,422,392 | 12/1983 | Dreyer et al. ........................ 111/167 X |
| 4,430,952 | 2/1984 | Murray ........................ 111/195 |
| 4,493,273 | 1/1985 | Gauchet et al. ..................... 111/176 X |
| 4,596,200 | 6/1986 | Gafford et al. ........................ 111/193 |
| 4,608,933 | 9/1986 | Wyrill, III ........................ 111/85 |
| 4,785,890 | 11/1988 | Martin ........................ 111/139 X |
| 4,834,189 | 5/1989 | Peterson et al. . |
| 5,092,255 | 3/1992 | Long et al. ........................ 111/167 |

FOREIGN PATENT DOCUMENTS

| | | |
|---|---|---|
| 180652 | 11/1917 | Canada . |
| 404153 | 4/1942 | Canada . |
| 2066214 | 5/1991 | Canada . |
| 2062160 | 9/1992 | Canada . |
| 2107125 | 10/1992 | Canada . |
| 79647 | 8/1955 | Denmark . |

OTHER PUBLICATIONS

Planter and Drill Ideas –Farm Journal –Mar. 1984.

Primary Examiner—Terry Lee Melius
Assistant Examiner—Victor Batson
Attorney, Agent, or Firm—Leonard Bloom

[57] ABSTRACT

A disc-type opener and seeder useful in direct seeding during zero-till operations includes index/presser wheels to prevent hairpinning of trash etc. A soil retainer wheel cooperates with the disc to close the furrow cut by the disc and to cover the seeds placed therein. All of the above wheels are adjustably mounted to a main frame together with a spring-biased furrow finishing wheel. Improved seed supply means designed to reduce seed bounce are provided. Multiple units are mounted to a tool bar. Minor modifications permit the opener/seeder to be installed on the shank of a chisel plow air seeder.

25 Claims, 10 Drawing Sheets

DISC OPENER

BACKGROUND OF THE INVENTION

This invention relates to an agricultural implement and in particular to an improved disc-type opener and seeder useful in direct seeding in low or zero tillage operations.

In recent years there has been an increased demand for more precise seed placement, reduced soil disturbance and displacement, reduced soil moisture loss incurred with soil tillage, reduced fuel consumption, reduced weed seed incorporation (resulting in reduced chemical usage) and increased efficiency, productivity and versatility for on-site farm equipment.

The above demands are due to a shift from conventional tillage practices to the new "zero tillage" environmentally sustainable practices of agriculture. To accomplish the goal of zero tillage a new practice termed "direct seeding" has been introduced into agriculture. The only seeding or planting tool capable of achieving "direct seeding" and "zero tillage" is a disc type opener.

There is also a need to address the matter of fuel conservation, by providing the agricultural industry with a seeding or planting tool that can meet the demands of the "zero till" minded farmers: accurate seed placement, (including positive individual disc opener depth control) zero tillage, moisture conservation, reduced weed seed incorporation, and a reduction in herbicide use, all meeting the demand for a reduction in fuel consumption in the agricultural industry. As seeding or planting is the first operation in the production of grain, providing a seeding or planting tool that requires no pre-seeding tillage, and considerably less horse power than the chisel plow type of air seeders, a large number of agricultural producers will switch to "zero tillage" and "soil conservation".

When "direct seeding" into untilled soil, accurate seed placement has proven to be a major problem, the problem being "hairpinning" Hairpinning occurs when straw, trash and/or crop residue becomes embedded in the seed furrow when the disc of the disc opener does not cut completely through the straw, trash and/or crop residue. This debris ends up in the seed furrow and is distributed from the bottom through to and out the top of the seed furrow. Seed is dispensed by the seed boot on top of this debris, and as the trailing half of the disc opener disc retracts from the seed furrow, the disc drags some of the straw, trash and/or crop residue back out of the seed furrow taking some of the seed up with it and depositing it at various levels and actually tossing some of the seed right up on top of the soil surface, resulting in erratic seed placement and very poor seed germination. Hair pinning also causes moisture loss due to the wick action of the exposed portions of the straw, trash and/or crop residue in the seed furrow.

SUMMARY OF THE INVENTION

The disc opener of the present invention alleviates the seed placement and wicking problems by providing special index/presser wheels which hold the straw, trash and/or crop residue in place against the soil surface at just the right time to allow the disc of the disc opener to cut clearly through, providing a clean seed furrow and allowing the seed to stay at the precise depth of the seed furrow for accurate seeding or planting depth.

The disc opener index/presser wheels address the problem of hair pinning by holding the straw, trash and/or crop residue firmly against the soil surface. This action is enhanced when one said wheel is angularly offset to the adjacent index/presser wheel. The straw, trash and/or crop residue is thus not only held firmly in place but is also tensioned resulting in an enhanced cutting action of the straw, trash and/or crop residue by the disc opener giving a clean trash free seed furrow absent of moisture robbing wick action common to prior art disc type openers and also reducing the amount of weed seed incorporation and germination.

As one feature of the invention, the index/presser wheels are strategically located at a point ahead of and beside the disc opener at a point where the straw, trash and/or crop residue is held firmly in place against the soil surface thus allowing for the soil to compress and form an indentation in the soil and providing a further gripping action by these wheels of the straw, trash and/or crop residue facilitating a clean complete cut of the straw, trash and/or crop residue producing a clean seed furrow enabling placement of the seed at the desired depth in the soil free of straw, trash and/or crop residue.

A further feature of the disc opener is that the index/presser wheels become and are the positive and precise adjustable depth control of the opener. These wheels are typically mounted on a torque arm with a strategically located pivot point, so as to locate said index/presser wheels ahead of and beside the opener disc at a point such that the straw, trash and/or crop residue is held firmly in place and the soil surface is cut by the disc opener at precisely the moment the disc is cutting that particular portion of straw, trash and/or crop residue, at the desired seeding or planting depth. The adjustment mechanism of the index/presser wheels typically consists of an arcuate bracket equipped with a battery of adjustment holes attached to an index/presser wheel torque arm and cooperating with a suitably positioned spring-loaded adjustment pin and bracket assembly attached to the disc opener main frame.

In a typical embodiment, the index/presser wheels are approximately 8 inches in diameter and 1 and ½ inches in width, with one of the wheels offset up to about 7 degrees from the seed openers' direction of travel and the opposing wheel. The depth adjustments may be in approximately ¾ inch increments, and adjustment is made by pulling the spring loaded pin, positioning the wheel torque arm to the desired seeding depth and allowing the spring loaded pin to pop back into place in the selected adjustment hole.

In accordance with another feature of the invention, the disc opener is equipped with a soil retainer wheel. This wheel serves two purposes: one is to keep the disc of the disc opener clean of soil when operating the disc opener in wet soil conditions; the second and most important use is to reduce soil disturbance as much as possible. (In prior art disc type openers the wheel positioned beside the disc has a depth control function and its positioning does not primarily facilitate a function dedicated to prevent soil disturbance.) The soil retainer wheel on the present disc opener addresses the demand for minimal soil disturbance required by the new zero till method of seeding or planting. This wheel has a unique positioning in close relation to the disc opener at a point towards the rear of the disc opener at a point where the disc opener has just left the seed furrow. Thus the retainer wheel acts to replace the soil disturbed by the disc opener to the seed furrow, greatly reducing the amount of soil displacement and disturbance and also reducing the amount of weed seed incorporation, which in turn reduces the amount of chemical herbicide required: a desired phenomena.

The retainer wheel is typically approximately ten inches in diameter and two inches in width in a preferred embodiment and the adjustment mechanism of the soil retainer wheel consists of an arcuate bracket with a series of adjustment holes attached to the soil retainer wheel torque arm and a pivot pin and a strategically positioned spring-loaded pin and bracket assembly attached to the main frame. The soil retainer wheel torque arm is so aligned so as to maintain the strategic alignment and relationship with the disc opener disc at whatever seeding or planting depth of the opener is selected. Adjustment of the soil retainer wheel is typically accomplished by pulling out the spring loaded pin, selecting the appropriate setting and allowing the spring loaded pin to pop back into its home position in a selected hole in the adjustment bracket. As stated, the soil retainer wheel is not a depth control device. It is, in use, typically set at least one half of an inch higher than the index/presser wheels. This compensates for the compression of the soil under the index/presser wheels and for the difference between the undisturbed and displaced soil the retainer wheel rolls over.

The introduction of the soil retainer wheel on the present disc opener addresses the demands for greater productivity, efficiency and versatility of agricultural equipment. The soil retainer wheel with its unique location on the disc opener allows the opener to operate at speeds of up to 12 miles per hour simply because of the effectiveness of the soil retainer wheel in retaining the soil at the soil surface. Operating at higher speeds means more productivity per hour from a given piece of equipment; conversely a small piece of equipment operated at higher speeds will do the same job as a larger, slower piece of equipment. This means lower equipment costs when using smaller equipment, lower power requirements with less fuel consumption per hour, and hence greater productivity, efficiency and versatility.

In a further aspect of the invention there is provided an adjustable seed tube and devices to restrict seed bounce. The seed tube furrow height may require adjustment depending on soil type and soil moisture conditions. The seed tube is typically attached to the main frame of the disc opener by means of a bolted bracket assembly. The seed tube also has two devices to eliminate seed bounce and damage—a problem with prior art disc type openers (especially when the seed is delivered to the disc type opener with air, as in an air seeder type of seed delivery system). The seed tube assembly of the present invention addresses the seed bounce and damage problem first with an air release vent in the seed tube consisting of a pressure drop chamber on the inner arc of the seed tube allowing the seed to decelerate while at the same time providing a route for the seed conveying air to escape before it reaches the end of the seed tube. This allows gravity to convey the seed the rest of the way out the bottom of the seed tube into the seed placement chamber where any remaining bounce the seed may have left is effectively eliminated. This seed placement chamber is attached to the lower end of the seed tube and is open such as to allow the seed to come to rest in the bottom of the seed furrow just in time before the soil retainer wheel replaces the disturbed and displaced soil.

The disc opener of the present invention typically completes the seeding or planting operation with a packer-type, furrow finishing wheel. This furrow finishing wheel firms the soil over the seed in the seed furrow allowing for faster moisture to seed transfer, which results in prompt seed germination. The furrow finishing wheel is offset up to 7° opposite the disc opener disc and up to 7° under at the bottom to complete the soil replacement to the seed furrow. The furrow finishing wheel also leaves a depression needed to help prevent soil erosion by trapping rain fall moisture in the depression. The furrow finishing wheel in a typical embodiment is approximately twelve inches in diameter and two inches in width.

The disc opener in a typical embodiment uses a standard 18 inch diameter disc, ¼ inch thick, with a tapered cutting edge to facilitate cutting of straw, trash and/or crop residue and to form the seed furrow. The disc opener is also unique in the manner the disc is mounted. The spindle the disc rotates on is supported on each end, attached to both left and right hand main frame members by a retainer bolt placed through the spindle and each main frame member thus holding the disc and spindle in place. Prior art disc type openers use a single torque arm with a welded spindle. Should the spindle break on a prior art disc opener the torque arm and spindle must be purchased as one unit. The unique mounting of the disc and spindle herein is accomplished with the use of the two members noted above forming the base frame for the disc opener. This "split" frame arrangement facilitates the adaptation of the invention to the present day chisel plow type air seeders without altering or replacing the chisel plow shank assembly, formerly not a possibility.

In another aspect of the invention the present disc opener's unique design allows the mounting of the disc opener ahead of the leading edge of a chisel plow shank. By mounting the disc opener direct to the chisel plow shank, the spring trip load setting is not compromised as the lever is not lengthened, whereas in prior art disc openers, mounting to the rear of the shank compromised the spring trip load settings as the lever is lengthened, diminishing the disc openers ability to penetrate the soil and to place the seed at the desired seeding or planting depth.

DESCRIPTION OF PREFERRED EMBODIMENTS

The disc opener 10 is shown in all the drawings as a left-hand disc opener. The right-hand opener is a mirror image of the left-hand opener and is typically used to off-set the side draft forces of the left-hand opener and vice-versa. Typically an equal number of left and right-hand openers are used on any given disc type seeder or planter, each mounted to an elongated tool bar which in turn is mounted to a tractor (not shown) in conventional manner.

The opener main frame 12 includes a left frame member 14 (FIG. 1) and a right hand frame member 16 (FIG. 2) each in the form of a flat bar and both welded at their frontal ends to opposing sides of the main torque arm 18 at its lower end. The main frame 12 on a left-hand opener has the left-hand frame member 14 offset about 7° to the right-hand frame member 16 (FIG. 2), the main torque arm 18, and the direction of forward travel T(FIG. 3) during use. (As noted above since the right-hand disc opener is a mirror image of the left-hand disc opener all offsets are the exact opposites of those for the left-hand disc opener.)

The main torque arm 18 is typically made of 3×3×¼ inch square tubing and is equipped with a spring trip assembly 20 and a mounting bracket 22. The main torque arm 18 is also equipped with a pivot pin 24 to allow the entire disc opener assembly to ride up and over obstructions by compressing a heavy spring 26 located within the trip assembly 20.

Figure 3:
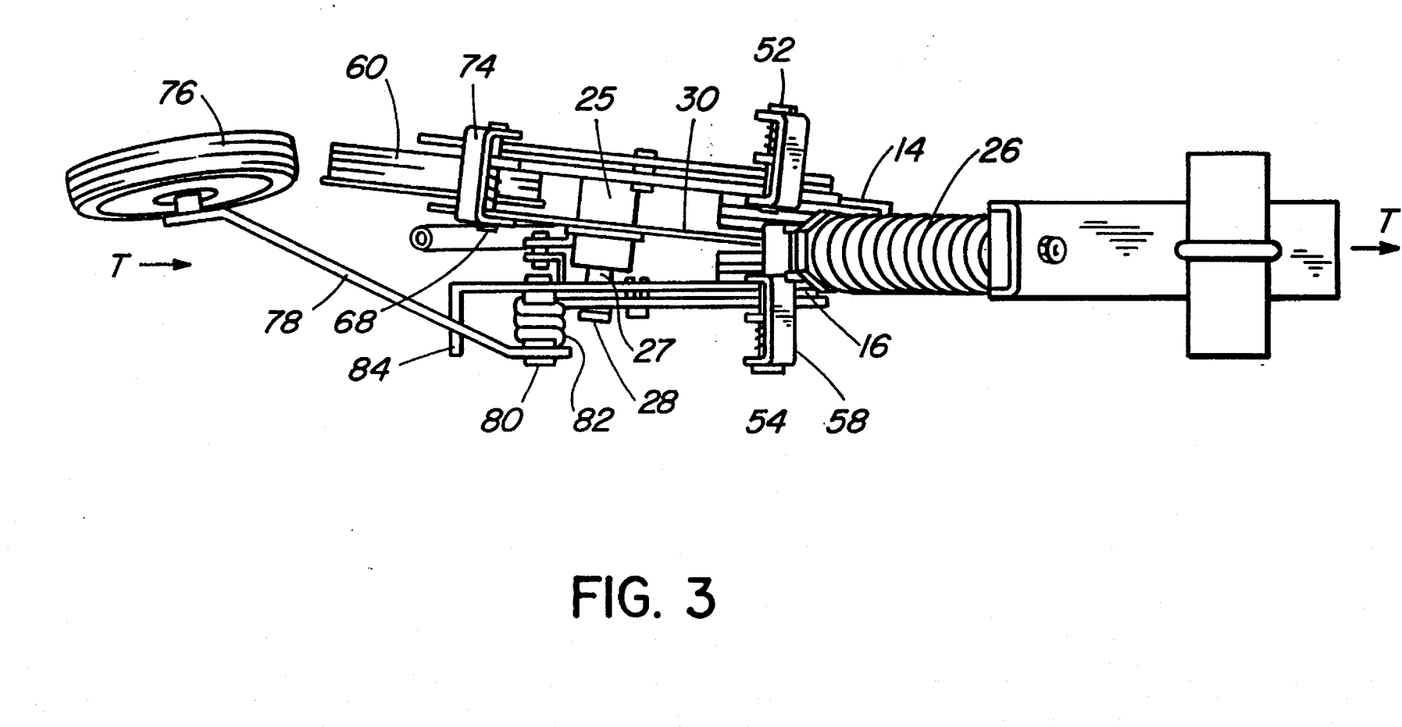
FIG. 3 is a top plan view thereof.

The opener disc 30 typically consists of an 18 inch diameter flat disc approximately ¼ inch in thickness, with a tapered cutting edge 23, mounted on a centre hub 25 (FIG. 3) equipped with tapered roller bearings mounted on a hollow spindle 27 which is drilled to accommodate a centre bolt 28. The centre bolt 28 attaches the disc hub assembly to the left-hand frame member 14 and to right-hand frame member 16. The disc 30 is offset about 7° to the left (as best seen in FIG. 3) to cause soil to deflect from the point at which the disc enters the soil to the bottom of the seed furrow and over 7° to the left to form the seed furrow.

As "hairpinning" is one of the most serious problems encountered when direct seeding into untilled soil (zero till), preceding the disc 30 of the disc opener are the index/presser wheels, including left-hand wheel 32 and right-hand wheel 34. Both wheels 32 and 34 operate in a direct relationship to the front and to the side of the opener disc 30. Hairpinning is greatly reduced when the wheels 32 and 34 press the straw, trash and/or crop residue on the soil surface, tightly tensioning the same against the soil surface at the precise moment that the disc edge contacts the soil and cutting completely through the straw, trash and/or crop residue.

Figure 4:
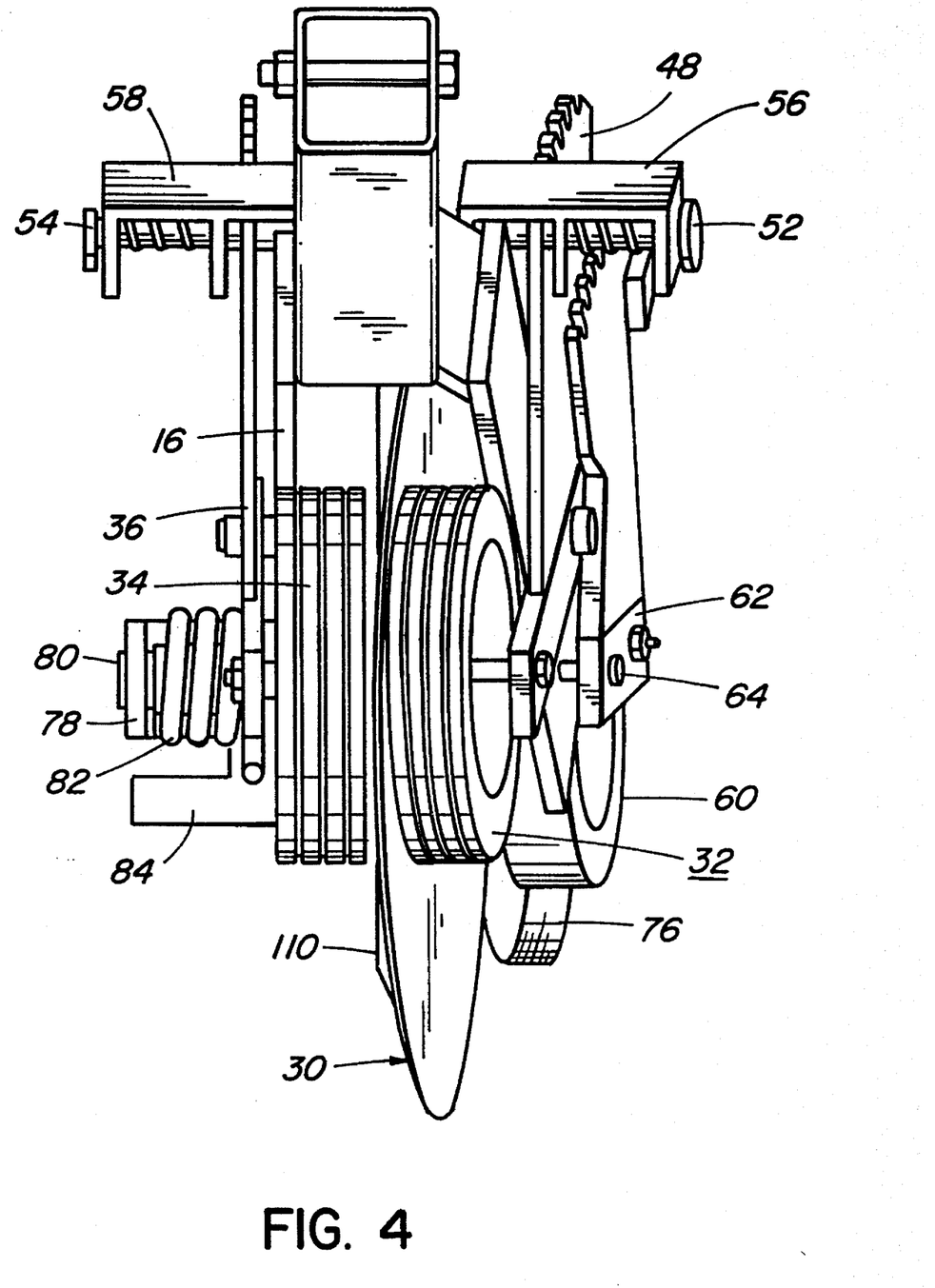
FIG. 4 is a front end elevation view thereof.
Figure 5:
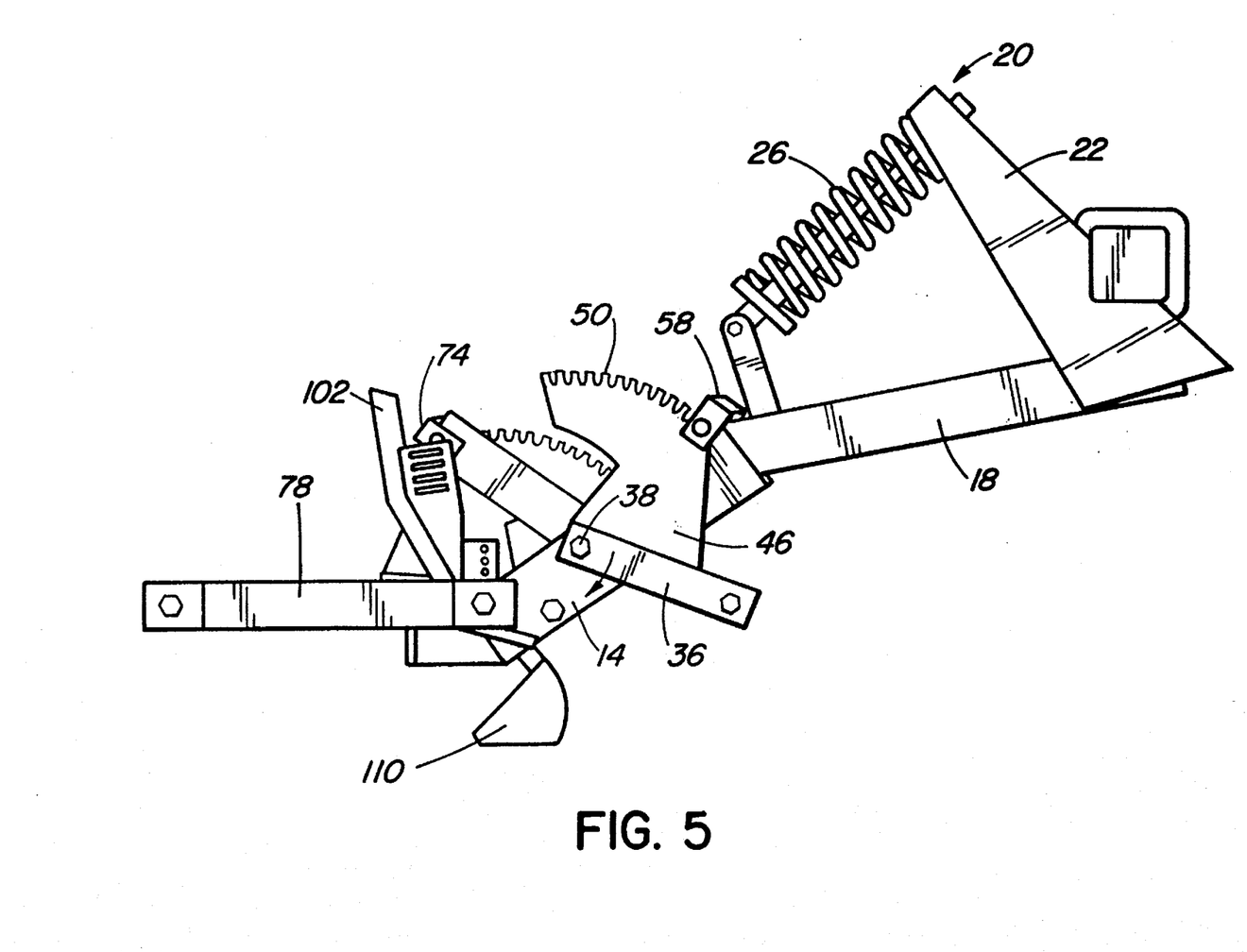
FIGS. 5 and 6 are side elevation views thereof with the disc and the several wheels removed.
Figure 6:
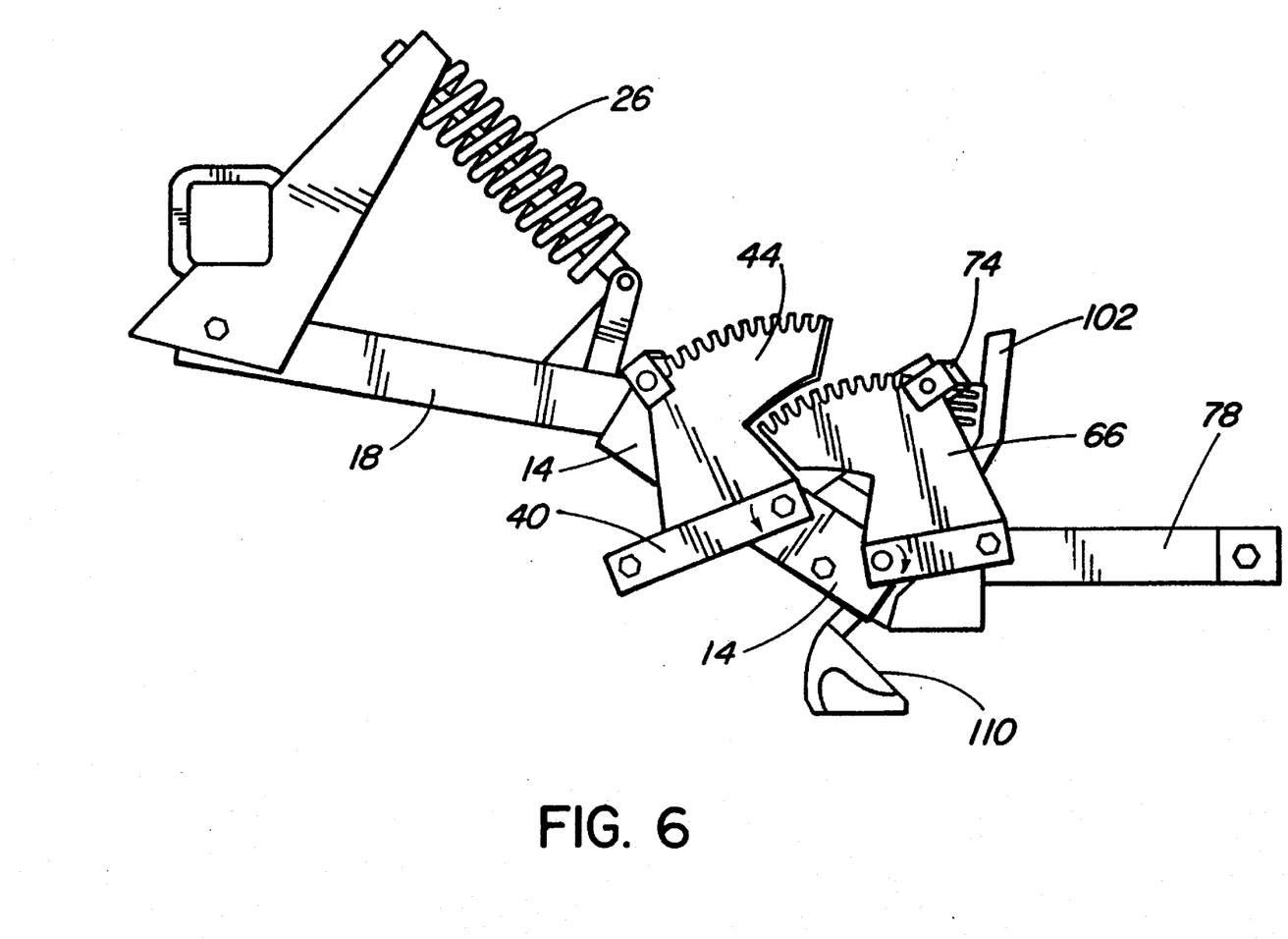
Figure 7:
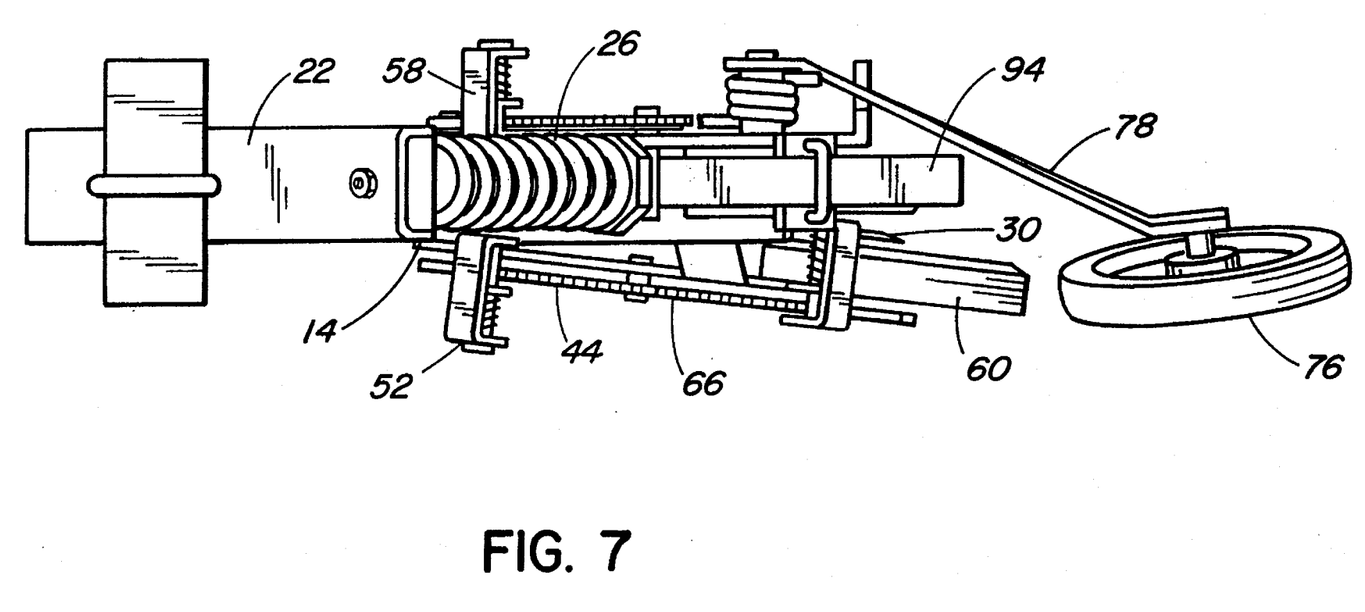
FIG. 7 is a top plan view of a second embodiment of the invention.

One index/presser wheel on each disc opener is offset 7° to correspond directly with the opener disc 30, (i.e. the left index/presser wheel on a left hand opener and the right hand wheel on a right hand opener). The right index/presser wheel 34 on a left hand opener (FIG. 4), and the left hand wheel 32 on a right hand opener are set parallel to the direction of the opener travel. With one index/presser wheel thus offset 7° wider to the rear in relation to the direction of the opener travel, straw, trash and/or crop residue is tensioned and held firmly to the soil surface, greatly increasing the cutting efficiency and allowing the disc 30 to form a clean seed furrow in the soil. The index/presser wheels 32 and 34 are typically of 8 inch diameter, 1 inch to 2 inches in width depending on the soil type.

Figure 1:
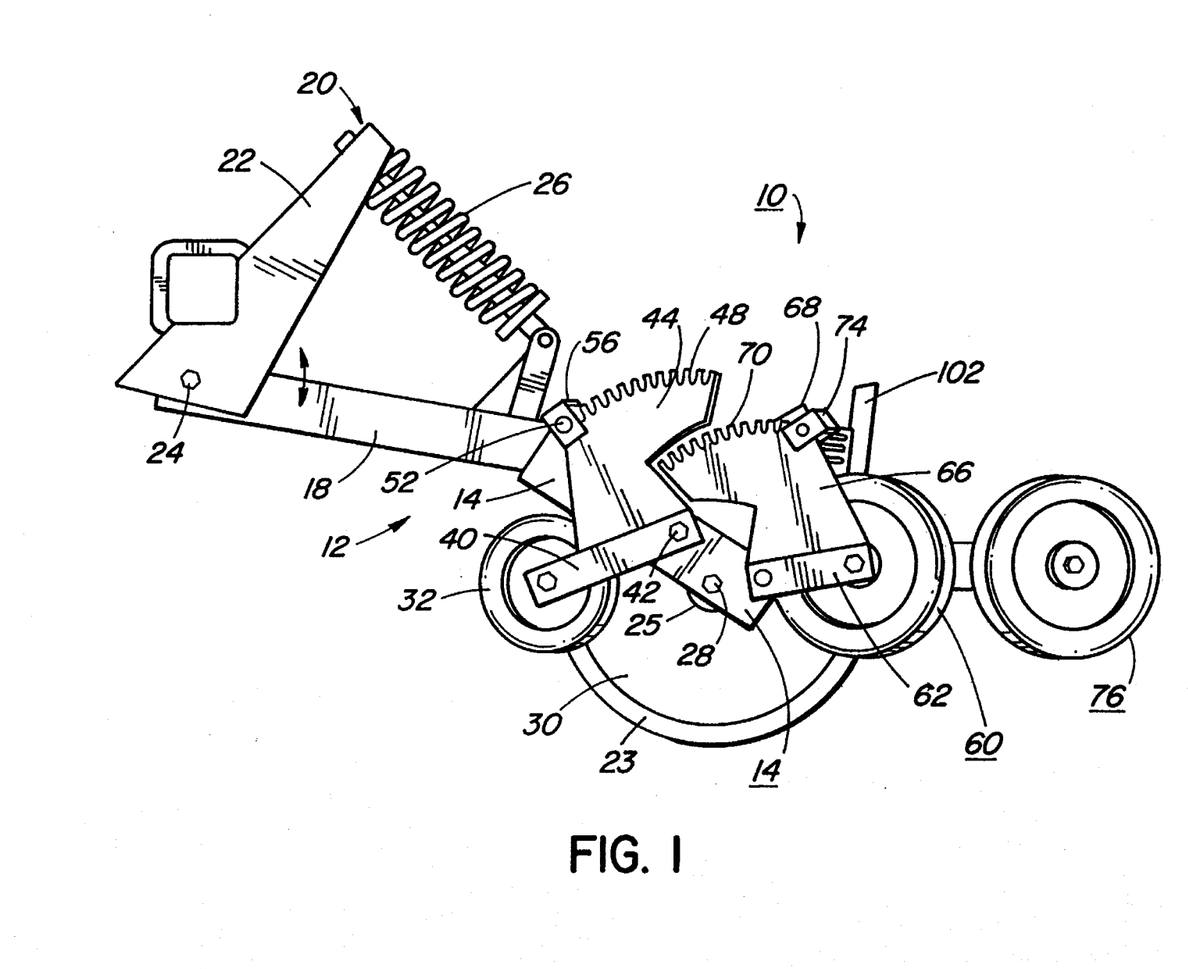
FIG. 1 is a side elevation view of a disc opener in accordance with a first embodiment of the invention.
Figure 2:
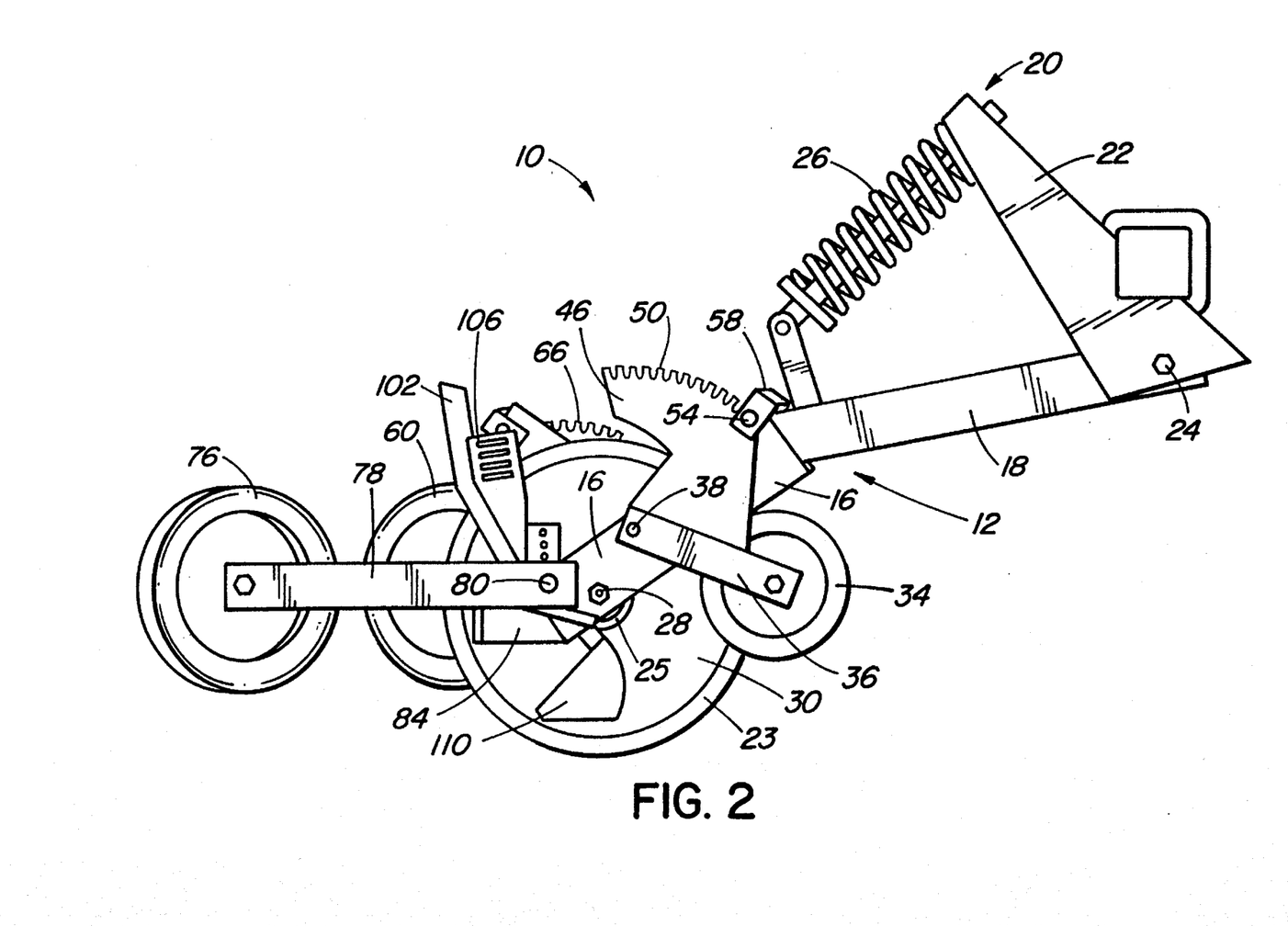
FIG. 2 is a side elevation view of the opposing side thereof.

The right hand index/presser wheel 34 is bolted to the right hand torque arm 36 which is attached to the right-hand main frame member 16 at the pivot point 38 all as seen in FIG. 2. The left-hand index/presser wheel 32 is bolted to the left hand torque arm 40 which is attached to the left-hand main frame member 14 at the pivot point 42 all as seen in FIG. 1.

The adjustment brackets for the index/presser wheels 32, 34 include the left and right arcuate brackets 44, 46 which are attached to each index/presser wheel torque arm 40 and 36 respectively, each equipped with a series of adjustment holes 48, 50 all as seen in FIGS. 1 and 2.

Adjustment of the index/presser wheels 32, 34 to gain the desired seeding or planting depth is accomplished by pulling a spring loaded pull pin 52, 54 and selecting identical hole positions in the left and right wheel adjusting brackets 44 and 46. The pull pins 52, 54 are mounted within pull pin brackets 56 and 58 which are equipped with spring retainers (not shown). The pull pin brackets 56, 58 are held in place by a weldment to the respective main frames members 14, 16.

The soil retainer wheel 60 (FIGS. 1, 3 and 4) is bolted to the retainer wheel torque arm 62. The soil retainer torque arm 62 maintains the very close parallel relationship between the disc 30 and the soil retainer wheel 60, whereby the soil retainer wheel contacts the soil at a point where the opener disc 30 has just left the seed furrow at the selected seeding or planting depth. A soil retainer wheel torque arm pivot pin 64 is provided in left hand main frame member 14 and is held in place with a washer and pin. A soil retainer wheel adjustment bracket 66 is attached to the soil retainer wheel torque arm 62 by a weldment to form a single unit. The soil retainer wheel 60 is easily adjusted by positioning a spring loaded pull pin 68 (FIGS. 1–3) in the appropriate positioning hole 70 in bracket 66. The adjustment pull pin assembly 74 is welded to the left hand main frame member 14.

The soil retainer wheel height must always be adjusted to correspond to the setting of the left hand index/presser wheel setting (with a left-hand disc opener) or to a lesser depth setting to allow the index/presser wheel 32 to always maintain contact with the soil. The soil retainer wheel 60 typically is a 10 inch diameter wheel at least 2 inches in width.

The disc opener is also equipped with a furrow finishing wheel 76. The furrow finishing wheel 76 in a left hand opener assembly is offset 7° to the left at the front of the wheel and 7° to the left at the top of the wheel as best seen in FIG. 3. In a right hand opener the furrow finishing wheel is offset 7° to the right both at the front and at the top of the wheel. The furrow finishing wheel 76 is connected to a torque arm 78 which connects to the rear bottom part of the right hand main frame member 14 and pivots about a pivot point defined by pivot pin 80 welded onto the furrow finishing wheel torque arm 78. The furrow finishing wheel torque arm 78 is biased by a coil spring 82 to maintain a constant down pressure on the furrow finishing wheel 76 while giving the furrow finishing wheel the freedom to follow the soil contour. The furrow finishing wheel torque arm 78 will move down to a maximum depth limited by a stopper 84 (FIG. 3). The furrow finishing wheel typically is 12 inches in diameter and 2 inches in width.

Figure 8:
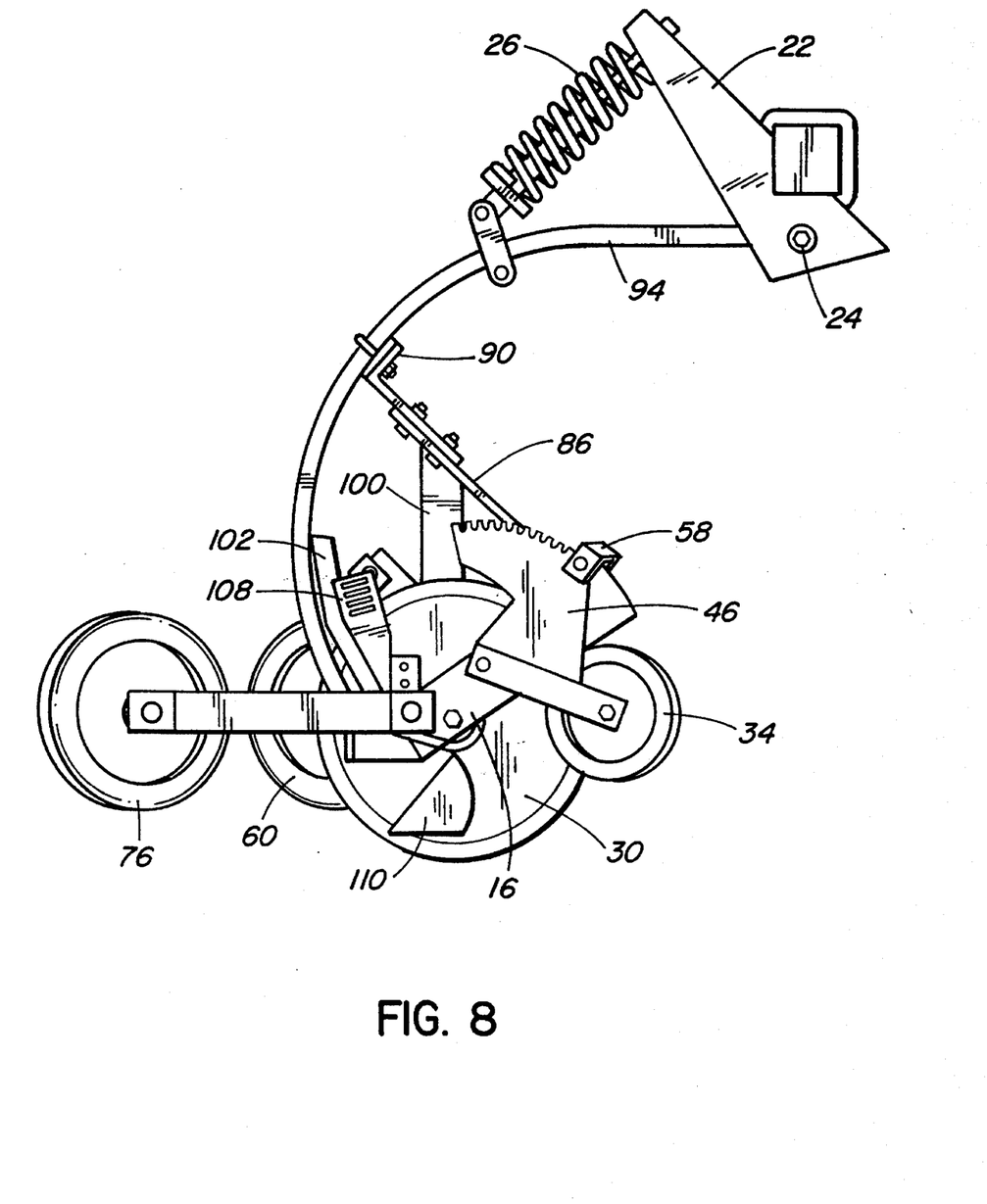
FIG. 8 is a side elevation view thereof.
Figure 9:
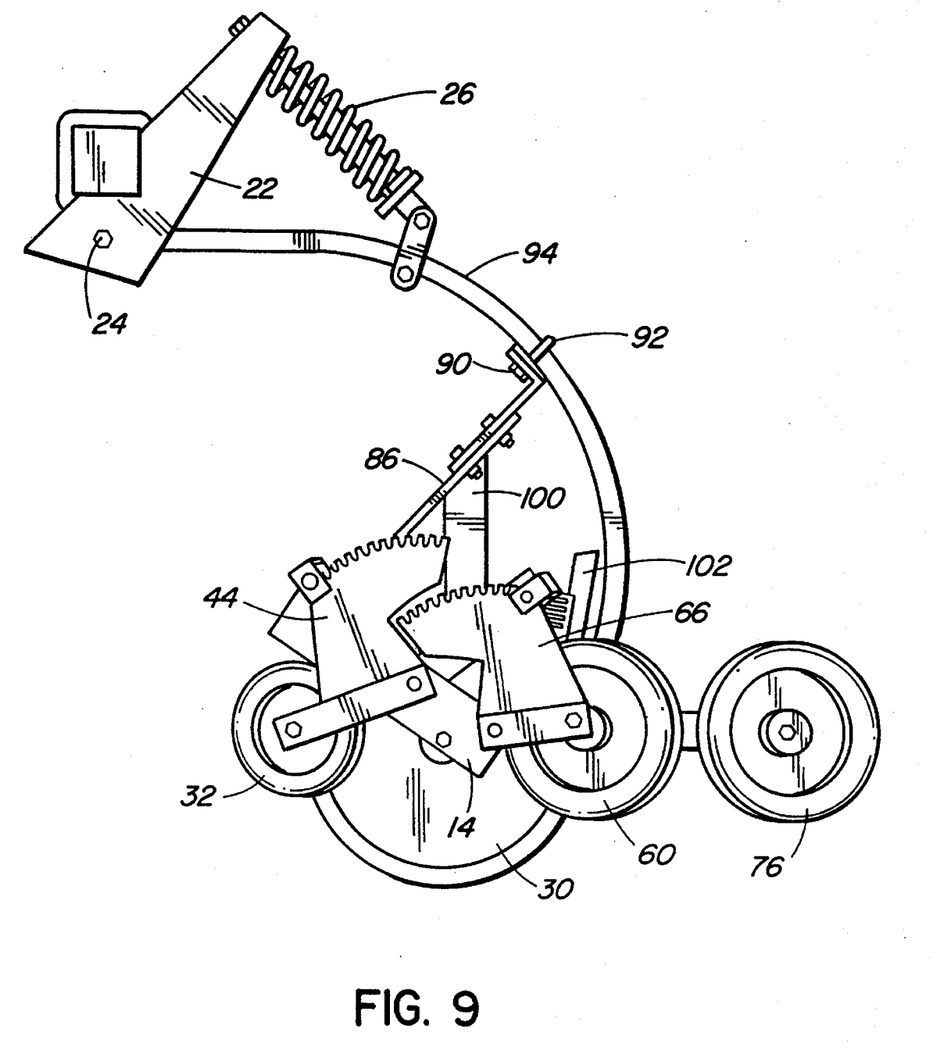
FIG. 9 is a side elevation view of the opposite side thereof.
Figure 10:
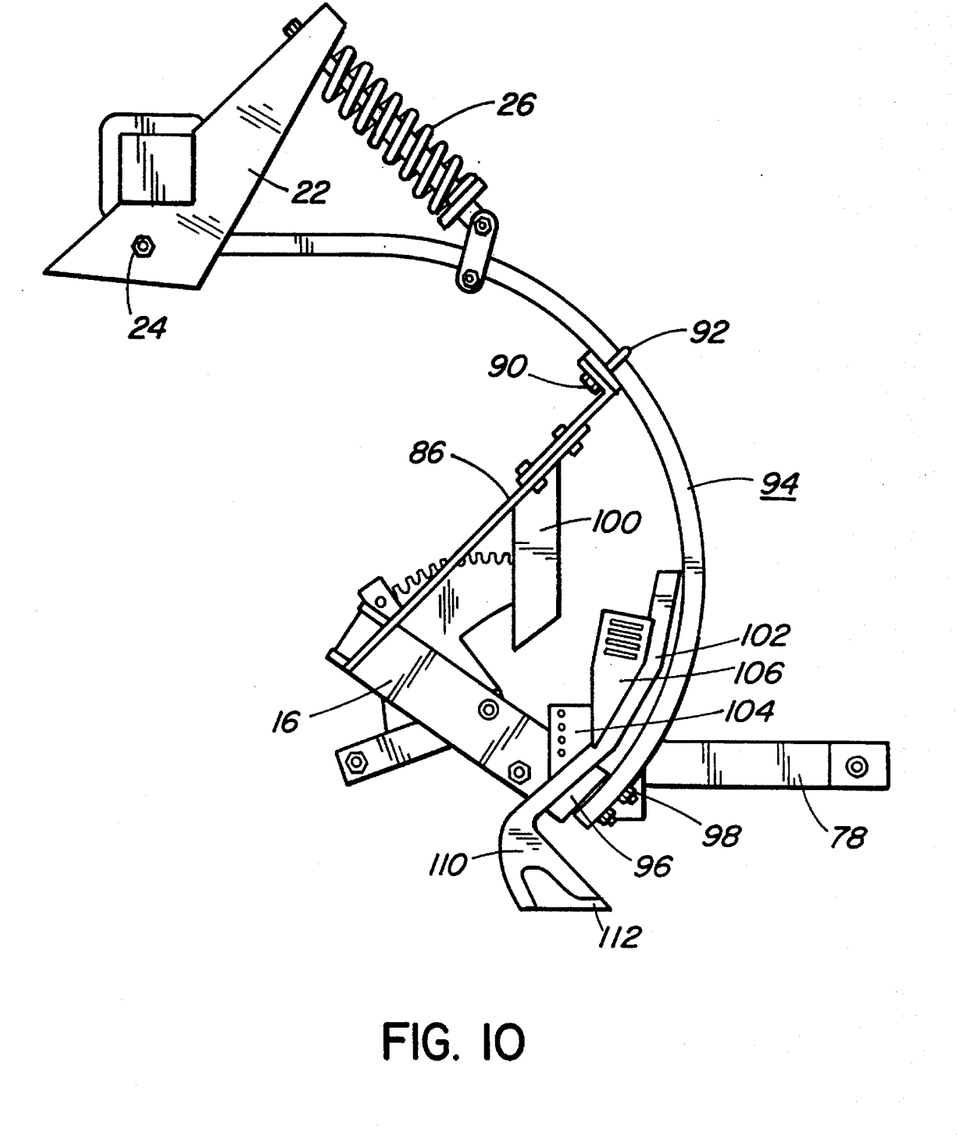
FIG. 10 is a side elevation view of the second embodiment with the opener disc, right hand frame member and the several wheels removed.

An alternate mounting system shown in FIGS. 7–10 allows the opener to be adapted to present day air seeder equipment designed to fit the chisel plow air seeder. FIGS. 8 and 9 are left side and right side views respectively showing the disc opener mounted on a chisel plow shank assembly. By suitably changing the assembly procedures the disc opener can be fitted to any chisel plow type air seeder with universal mounting brackets. FIG. 10 shows the disc opener with the left hand main frame member 14 removed from the figure; a main torque arm is not used; instead chisel plow mounting brackets are used, consisting of a stabilizer bar 86 the lower end of which is welded between the forward ends of main frame members 14 and 16 and upper shank mount "L" shaped bracket 90 together with U bolt 92 which is used to attach the bracket 90 to the chisel plow shank 94. The upper shank mount "L" shaped bracket 92 is equipped with long adjustment holes at the point where it over-laps and is bolted to the upper end of stabilizer bar 86 to make this a universal shank mount. A chisel plow shank bottom mount bracket 96 is welded to the right hand main frame member 16 on the lower inside. Two bolts 98 are used to attach the chisel plow shank 94 to the lower shank mount bracket 96. During assembly of the shank mounted disc opener, the shank stabilizer bracket 86 is welded to the main frame members 14 and 16 and thus takes the place of the main torque arm bracket 18 of the first embodiment (FIG. 1). Item 100 is part of the shank stabilizer bracket and is also welded to the left hand main frame member 14 to give continuity to the disc opener when it is adapted to the chisel plow type air seeders.

Modifying the base frame from the FIG. 1–6 to the FIG. 7–10 configuration adapts the present disc opener to most chisel plow type air seeders without any modifications to the chisel plow type air seeder being needed.

The disc openers (both embodiments) are each preferably equipped with an adjustable seed tube 102. The seed tube is attached to a seed tube mount 104 with two bolts and a mounting position is selected from the multiple bolt holes in the seed tube mount 104 (which in turn is welded to the right hand main frame member 16. To accommodate the disc opener to modern air seeder air delivery systems, the seed tube 102 is equipped with two seed bounce restrictors. The first is a pressure drop chamber 106 on the inner arc of the seed tube 102 allowing the conveying air to dissipate through air vents 108 in the opposing sides of the pressure drop chamber 106 and decelerating the seed as it continues down the seed tube 102 to the seed placement chamber 110. Here any seed bounce that may still be left is eliminated within the seed placement chamber 110 allowing the seed and any remaining air out the back 112 of the seed placement chamber with the seed being then covered by the soil being replaced by the soil retainer wheel 60 (FIG. 1). The seed placement chamber 110 is open to the disc 30 on the side nearest the disc, such that the disc 30 forms one side of the seed placement chamber. This serves to place the seed as close to the opener disc 30 as possible in the bottom of the seed furrow.

Preferred embodiments of the invention have been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

We claim:

1. A disc opener for zero or low tillage operations including a main frame adapted to be moved along a forward travel path and having an opener disc rotatably mounted thereon and arranged to open a narrow furrow in the soil, a pair of wheels mounted to said frame on opposing sides of said disc and arranged to press and hold straw, trash or crop residue against the soil surface at a location where said disc is cutting into the soil surface thereby to enhance the cutting action of said disc and to alleviate hairpinning; a soil retainer wheel arranged to contact the soil in close proximity to a trailing edge portion of the disc to replace soil into the furrow made by said disc and to assist in closing the furrow; said soil retainer wheel being parallel to said disc with both of the latter being angularly offset to the normal forward path of travel of the main frame during use so as to cut a seed furrow of the desired width, and a seed placement device adjacent said disc for placing seeds into the seed furrow with said soil retainer wheel assisting in closing said furrow with minimal soil disturbance; said wheels of said pair being each provided with an adjustment mechanism to permit the heights of said wheels relative to said main frame and said disc to be adjusted to adjust the depth of the furrow cut by said disc while maintaining the hairpin-alleviating action of said pair of wheels; and a mechanism for adjusting the height of said retainer wheel relative to said main frame while maintaining the close proximity between the disc and said retainer wheel at the selected cutting depth; and wherein one of said pair of wheels is parallel to said disc and the other is parallel to the forward path of travel when in use to tension the straw, trash or crop residue contacted thereby during forward movement along the path of travel and further enhance the cutting action of said disc.

2. The disc opener of claim 1 including a rearwardly disposed furrow finishing wheel for engaging and forming the soil over the furrow cut by said disc.

3. The disc opener of claim 2 wherein the furrow finishing wheel is mounted by a spring loaded torque arm to said frame to apply downward pressure to said finishing wheel.

4. The disc opener of claim 1 wherein said main frame includes right and left hand main frame members, each of said pair of wheels being mounted to a respective one of said main frame members and said soil retainer wheel being mounted to one of said main frame members.

5. The disc opener of claim 4 wherein said disc is located between said main frame members and is mounted on an axle defining means extending between and connected to both of said frame members.

6. The disc opener of claim 1 wherein the seed placement device includes a seed delivery tube mounted to said main frame, said seed delivery tube having a vented pressure drop chamber therein to reduce air velocity through the seed delivery tube and reduce seed bounce and damage.

7. The disc opener of claim 1 wherein said main frame includes a forward torque arm pivotally secured at its forward end to a spring loaded assembly to permit the entire disc opener assembly to ride up over obstructions during use.

8. The disc opener of claim 1 wherein said main frame includes a bracket assembly for mounting and connecting said main frame to a chisel plow shank.

9. A disc opener for zero or low tillage operations including a main frame adapted to be moved along a forward travel path and having an opener disc rotatably mounted thereon and arranged to open a narrow furrow in the soil, a pair of wheels mounted to said frame on opposing sides of said disc and arranged to press and hold straw, trash or crop residue against the soil surface at a location where said disc is cutting into the soil surface thereby to enhance the cutting action of said disc and to alleviate hairpinning; a soil retainer wheel arranged to contact the soil adjacent to a trailing edge portion of the disc to replace soil into the furrow made by said disc and to assist in closing the furrow; said soil retainer wheel being parallel to said disc with both of the latter being angularly offset to the normal forward path of travel of the main frame during use so as to cut a seed furrow of the desired width, and a seed placement device adjacent said disc for placing seeds into the seed furrow with said soil retainer wheel assisting in closing said furrow with minimal soil disturbance; and wherein one of said pair of wheels is parallel to said disc and the other is parallel to the forward path of travel when in use to tension the straw, trash or crop residue contacted thereby during forward movement along the path of travel and further enhance the cutting action of said disc.

10. The disc opener of claim 9 including a rearwardly disposed furrow finishing wheel for engaging and forming the soil over the furrow cut by said disc.

11. The disc opener of claim 10 wherein the furrow finishing wheel is mounted by a spring loaded torque arm to said frame to apply downward pressure to said finishing wheel.

12. The disc opener of claim 9 wherein said wheels of said pair are each provided with an adjustment mechanism to permit the heights of said wheels relative to said main frame and said disc to be adjusted to adjust the depth of the furrow cut by said disc while maintaining the hairpin-alleviating action of said pair of wheels.

13. The disc opener of claim 12 further including a mechanism for adjusting the height of said retainer wheel relative to said main frame while maintaining the close proximity between said disc and said retainer wheel at the selected cutting depth.

14. New disc opener of claim 9 wherein said main frame includes right and left hand main frame members, each of said pair of wheels being mounted to a respective one of said main frame members and said soil retainer wheel being mounted to one of said main frame members.

15. The disc opener of claim 14 wherein said disc is located between said main frame members and is mounted on an axle defining means extending between and connected to both of said frame members.

16. The disc opener of claim 9 wherein said main frame includes a forward torque arm pivotally secured at its forward end to a spring loaded assembly to permit the entire disc opener assembly to ride up over obstructions during use.

17. The disc opener of claim 9 wherein said main frame includes a bracket assembly for mounting and connecting said main frame to a chisel plow shank.

18. A disc opener for zero or low tillage operations including a main frame adapted to be moved along a forward travel path and having an opener disc rotatably mounted thereon and arranged to open a narrow furrow in the soil, a pair of wheels mounted to said frame on opposing sides of said disc and arranged to press and hold straw, trash or crop residue against the soil surface both at a location where said disc is cutting and while said disc is cutting into the soil surface thereby to enhance the cutting action of said disc and to alleviate hairpinning; and including a soil retainer wheel arranged to contact the soil adjacent to a trailing edge portion of the disc to replace soil into the furrow made by said disc and to assist in closing the furrow, while the soil on both sides of said furrow remains substantially undisturbed, said opener disc being angularly offset to effect soil displacement as the disc cuts and moves therethrough at a selected cutting depth, said soil retainer wheel being substantially parallel to said disc with both of the latter being angularly offset to the normal forward path of travel of the main frame during use so as to provide a seed furrow of the desired width and one of said pair of wheels being substantially parallel to said disc and the other being substantially parallel to the forward path of travel when in use to tension the straw, trash or crop residue contacted thereby during forward movement along the path of travel and enhance the cutting action of said disc.

19. The disc opener of claim 18 including a rearwardly disposed furrow finishing wheel for engaging and forming the soil over the furrow cut by said disc.

20. The disc opener of claim 19 wherein the furrow finishing wheel is mounted by a spring loaded torque arm to said frame to apply downward pressure to said finishing wheel.

21. The disc opener of claim 18 wherein said main frame includes right and left hand main frame members, each of said pair of wheels being mounted to a respective one of said main frame members and said soil retainer wheel being mounted to one of said main frame members.

22. The disc opener of claim 21 wherein said disc is located between said main frame member and is mounted on an axle defining means extending between and connected to both of said frame members.

23. The disc opener of claim 21 wherein each of said pair of wheels and said soil retainer wheel is mounted to a respective torque arm, each said torque arm being attached to said frame at a respective pivot point whereby individual height adjustments of said wheels are made by changing the angular positions of said torque arms relative to said frame.

24. The disc opener of claim 18 further including a seed delivery tube mounted to said main frame and having a seed placement chamber therein in close proximity to said disc to place seeds in the furrow made thereby.

25. The disc opener of claim 24 wherein said seed delivery tube has a vented pressure drop chamber therein to reduce air velocity through the seed delivery tube and reduce seed bounce and damage.

* * * * *